United States Patent [19]

Vinel

[11] Patent Number: 5,701,303
[45] Date of Patent: Dec. 23, 1997

[54] ASYNCHRONOUS TIME-DIVISION MULTIPLEX PACKET TRANSMISSION LINK CONTROL INFORMATION TRANSMISSION METHOD

[75] Inventor: Paul Vinel, Velizy, France

[73] Assignee: Alcatel Cit, Paris, France

[21] Appl. No.: 791,305

[22] Filed: Nov. 14, 1991

[30] Foreign Application Priority Data

Nov. 15, 1990 [FR] France ................ 90 14212

[51] Int. Cl.$^6$ .................................. H04J 3/12
[52] U.S. Cl. .................................. 370/522
[58] Field of Search .................. 370/110.1, 94.1, 370/94.2, 60, 60.1, 95.1, 95.3, 111, 522, 395, 465, 476, 426, 528; 371/32, 37.1

[56] References Cited

U.S. PATENT DOCUMENTS

| | | | |
|---|---|---|---|
| 4,357,700 | 11/1982 | Alvarez | 370/95.3 |
| 4,933,935 | 6/1990 | Adams | 370/94.1 |
| 4,970,720 | 11/1990 | Esaki | 370/94.1 |
| 5,008,663 | 4/1991 | Adams | 370/85.7 |
| 5,029,163 | 7/1991 | Chao et al. | 370/95.1 |
| 5,051,988 | 9/1991 | Kawahigashi | 370/110.1 |
| 5,123,014 | 6/1992 | Federkins | 370/110.1 |
| 5,191,583 | 3/1993 | Pearson et al. | 370/94.1 |

FOREIGN PATENT DOCUMENTS

WO8603642 6/1986 WIPO .......... H04L 11/20

OTHER PUBLICATIONS

IEEE INFOCOM '90, The Conference on Computer Communications, Ninth Annual Joint Conference of the IEEE Computer and Communications Societies, San Francisco, CA, Jun. 3–7, 1990, pp. 105–115, IEEE, York, US; S. Dravida et al.: "Error performance of IEEE 802.6 metropolitan area networks".

IEEE International Conference on Communications ICC '90, Atlanta, Apr. 16–19, 1990, vol. 3, pp. 826–830, IEEE, New york, US; G. Fioretto et al.: "ATM based network transport service".

*Primary Examiner*—Douglas W. Olms
*Assistant Examiner*—Chau T. Nguyen
*Attorney, Agent, or Firm*—Sughrue,Mion,Zinn,Macpeak & Seas, PLLC

[57] ABSTRACT

In a method of transmitting asynchronous time-division multiplex transmission link control information the control information produced by the control process is transmitted in the form of control cells. At the transmitting end the control cells conform to a format enabling them to be identified as such, the empty cells to be transmitted on the link are identified and any control cell to be transmitted is substituted on the link for an empty cell which is not transmitted. At the receiving end the control cells are detected and extracted to be used in the control process and are replaced as necessary with empty cells.

6 Claims, 1 Drawing Sheet

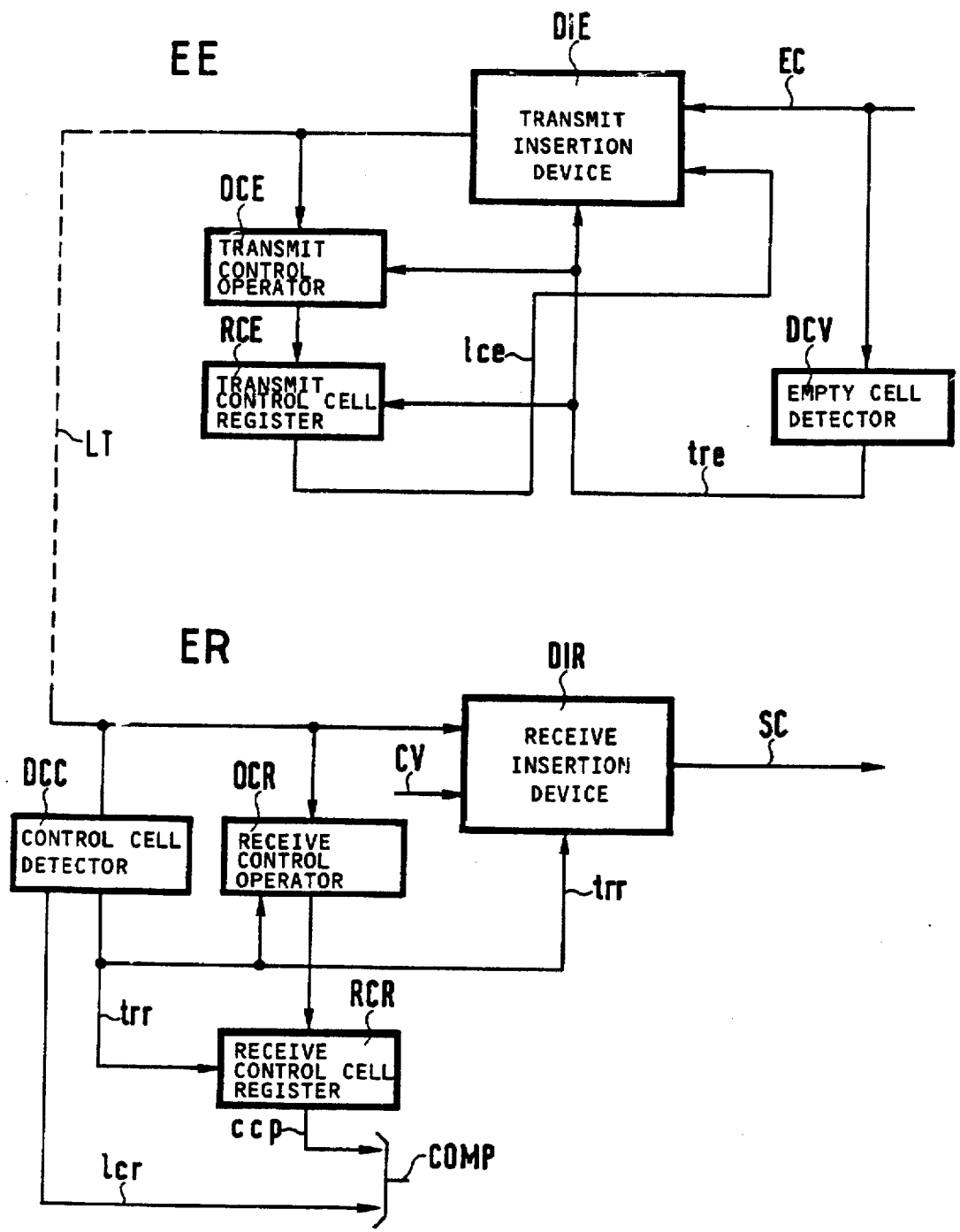

ASYNCHRONOUS TIME-DIVISION MULTIPLEX PACKET TRANSMISSION LINK CONTROL INFORMATION TRANSMISSION METHOD

BACKGROUND OF THE INVENTION

1. Field of the Invention

The present invention concerns an asynchronous time-division multiplex packet transmission link control information transmission method.

2. Description of the Prior Art

An asynchronous time-division multiplex packet transmission link is a transmission link for digital signals conveying units of information called cells.

These cells, also called packets, each comprise a label containing an indication enabling the destination of the cell to be identified together with call data.

The cells of a plurality of calls are conveyed over the link one after the other in no particular order.

When the link does not have any call cells to convey, it conveys an empty cell with the same format as a call cell so that cells form a continuous sequence on the link.

In the context of a call, the transmission may be subject to familiar transmission error detection and correction measures. Additionally, it is usually necessary to provide means for evaluating the quality of any transmission link.

This can be done in a conventional way by calculating at the transmitting end a control character dependent on the information transmitted, in accordance with a Control Process. Transmitting this control character over the link, calculating at the receiving end a control character dependent on the received information, using the same "Control Process" the same as at the transmitting end, and comparing the calculated control character with the transmitted control character, as received over the link, any difference between them indicating an error which is blamed on transmission conditions.

As a general rule, on the transmission link, the information transmitted is structured, this structure comprising a location for the control character immediately or somewhat after the information on which it has been calculated.

This type of control information transmission method cannot be used in asynchronous time-division multiplex cell transmission. The transmission information on which the control character must be calculated is made up of cells and it must itself be transmitted in the form of cells. As already explained, the link receives and must convey cells in a continuous, sequence. This leaves no room for the control information.

SUMMARY OF THE INVENTION

The present invention consists in an asynchronous time-division multiplex cell transmission link control information transmission method in which the control information produced by the control process is transmitted in the form of control cells characterized in that, at the transmitting end, the control cells conform to a format enabling them to be identified as such, the empty cells to be transmitted on the link are identified, and any control cell to be transmitted is substituted on the link for an empty cell which is then not transmitted, whereas at the receiving end, the control cells are detected and extracted to be used in the control process and are replaced, as required, with empty cells.

To be applied in the prior art manner as described above, a solution of this kind would require an empty cell to be available immediately a control cell were ready to be transmitted. There is no reason why this should be so.

According to another feature of the invention, the control process is suspended after a control cell has been prepared for a time period representing the time interval between the time at which the control cell is ready and that at which it is transmitted.

A solution of this kind amounts to applying only a statistical check to the link transmission quality. A more comprehensive check might of course be desirable.

According to another feature of the invention, immediately a control cell is ready to be transmitted it is stored pending the availability of an empty cell and the control process is reinitialized and when an empty cell is present it is replaced by the stored control cell, a new control cell is stored and the control process is again reinitialized, whereas at the receiving end the control process is reinitialized as each control cell is received.

According to another feature of the invention, the control process comprises a minimum control time period before which any reinitialization can take place.

The various objects and features of the invention will now be described in more detail in the following description of one embodiment of the present invention given with reference to the appended drawing which represents the block diagram of a link equipment designed to implement the invention.

DETAILED DESCRIPTION OF THE INVENTION

The equipment shown in the appended drawing comprises a transmit end EE connected to a receive end ER by a link LT. This equipment as a whole comprises, in series, an input EC for cells to be transmitted, a transmit insertion device DIE, the transmission link LT, a receive insertion device DIR and a received cell output SC.

The cell input EC supplies a stream of contiguous asynchronous time-division multiplex cells comprising call cells and empty cells. The proportion of empty cells depends on the traffic. There are always at least some empty cells.

The transmit insertion device DIE normally establishes continuity between the cell input EC and the link LT, all cells from the Cell input EC being transmitted to the link ET, but it enables occasional replacement of an empty cell with a control cell, as will be explained later.

The link LT conveys the asynchronous time-division multiplex cells.

The receive insertion device DIR normally establishes continuity between the transmission link LT and the cell output SC, all cells from the LT being transmitted to the output SC, but it enables occasional replacement of a control cell with an empty cell, as will be explained later.

At the transmitting end there is also an empty cell detector DCV, a transmit control operator OCE and a transmit control cell register RCE.

The empty cell detector DCV identifies any empty cell at the cell input EC. When the time comes to transmit a control cell, already prepared in the transmit control cell register RCE, and after detecting the arrival of an empty cell on the link EC, it produces a signal tre addressed to the transmit insertion device DIE. This has just received the empty cell and was about to transmit it to the link LT; instead it replaces it with the cell supplied to it over the link lce by the transmit control register RCE.

The transmit control operator OCE connected to the output of the transmit insertion device DIE receives the information transmitted over the link LT, applies a control process and establishes in this context control information to be placed in a control cell. During a preceding stage it has therefore contributed to the preparation of the control cell whose transmission on the link LT has just been described, which it has supplied to the transmit control register RCE. The signal tre tells it that the cell beginning to be transmitted is the last to which the current control process should be applied. On completion of the transmission of this cell the current process must be halted and reinitialized.

The register RCE receives also the signal tre. On completion of the transmission of the current cell the register RCE will store the control cell provided by the transmit control operator OCE immediately before the latter is reinitialized.

At the transmitting end, the control process starts on a reinitialization instigated by the signal tre. It halts on the next signal tre when a previous control cell has just been transmitted. The resulting control information constitutes a current control cell which is stored in the transmit control cell register RCE to be transmitted later instead of an empty cell. This control cell has a special format enabling it to be recognized as such.

This process could be repeated for each empty cell. However, the effect of this would be to eliminate empty cells from the link LT and to generate persistent control activity; both these consequences can be seen as disturbing normal transmission and therefore undesirable.

A simple solution is to interrupt the process when a control cell is ready until this cell has been transmitted. However, this has the disadvantage that in periods of high traffic it would allow only statistical evaluation of transmission quality. The invention therefore makes provision for the introduction of a time constant, for example, into the empty cell detector DCV so that it produces the signal tre on detecting an empty cell only if a predetermined minimum time interval has elapsed since it supplied the previous signal tre.

Note that although the time interval separating the production of successive signals tre, and therefore the time interval between transmission of successive control cells, therefore has a minimum duration it has no predetermined maximum duration. This cannot be otherwise in the context of the example being described. The current control process then continues and will merely be less effective.

At the receiving end ER there are additionally a control cell detector DCC, a receive control operator OCR and a receive control cell register RCR.

The control cell detector DCC recognizes each control cell, places it on a link lcr and, at the end of it, produces the signal trr.

The receive control operator OCR connected to the link LT receives the information transmitted on the link LT, applies the same control process as at the transmitting end and establishes accordingly control information intended for a control cell. The receive control operator therefore prepares control cells using the same control process and applied to the same information as was done at the transmit end, and supplies these newly-prepared control cells to the receive control register RCR. The signal trr tells the receive control operator OCR that the cell that has just been received is the last to which the current control process should be applied. The current process is halted and reinitialized.

The register RCR also receives the signal trr. The register RCR stores the control cell supplied by the receive control register OCR immediately before the latter is reinitialized.

A comparator device COMP (not shown) receives the received control cell supplied by the device DCC on the link lcr. Before the output of the control cell register RCR has changed in response to the signal lte the comparator device COMP receives also the control cell cct previously established by the operator OCR. These two cells must be identical. If not, the device COMP will report a transmission error. The analysis of such reports provides a means of evaluating the transmission quality of the link LT.

The figure also shows a branch of the link trr terminating at the receive insertion device DIR. These arrangements will be used, as required, to replace the control cell in the received information with an empty cell CV to re-establish the flow of data at the output SC as it was at the input EC.

At the receiving end the control process starts at a reinitialization instigated by the signal trr. It is halted on the next signal trr, at which time there has just been received a control cell previously established at the transmitting end. The control cell resulting from this process is stored in the register RCR. From this time it is available to the comparator device COMP. When the next control cell transmitted by the link LT is received it is supplied to the comparator device COMP which can report any disparity, that is to say any transmission error on the link LT. Of course, the error might relate to the transmission of the control cell or to the operation of the control equipment. As the probability of the latter errors is much lower, they are ignored.

Of course, in the foregoing description, all references to storing or processing a control cell obviously cover the situation in which, to save time or to reduce the size of the equipment, only the information from the cell useful to the process in which the cell is involved is stored or processed.

Generally speaking, it is obvious that the foregoing description has been given by way of non-limiting example only and that numerous variants are feasible without departing from the scope of the invention. In particular, the equipment described for implementing the invention may be implemented in many other forms and in particular in the form of a stored program processor combining the functions described with other functions also relating to the asynchronous time-division multiplex link and not described in the present document.

What is claimed is:

1. A method of transmitting control information over an asynchronous time-division multiplex cell transmission link between a transmitting end and a receiving end, said method comprising the steps of:

receiving at said transmit end a first sequence of asynchronous time-division multiplex cells, each containing an indication of a destination of the cell, to be transmitted over said link from said transmitting end to said receiving end, said first sequence of cells including both data cells and empty cells, said empty cells having substantially the same format as said data cells:

preparing at least a first control cell containing control information generated in accordance with a plurality of the data cells of the first sequence;

detecting said empty cells in said first sequence of cells;

replacing a detected empty cell with said first control cell in said first sequence of cells to form a second sequence of cells including said first control cell and said plurality of data cells;

transmitting said second sequence of cells from said transmitting end to said receiving end;

detecting said first control cell in the second sequence of cells received at said receiving end; and replacing the detected first control cell with an empty cell to the extent required at said receiving end, to reconstitute said first sequence of cells.

2. A method according to claim 1, wherein said control information is generated in accordance with a control process comprising processing of successive cells, said method further comprising the step of suspending said control process for a predetermined period of time after each control cell has been prepared.

3. A method according to claim 2, wherein said predetermined period of time corresponds to a time interval between the preparation of said first control cell and the transmission of said first control cell as part of said second sequence.

4. A method according to claim 1, wherein:

said step of preparing said first control cell comprises generating said control information in accordance with a control process and storing said first control cell in a storage location when said first control cell has been prepared;

said step of replacing said detected empty cell comprises replacing said detected empty cell with said first control cell obtained from said storage location; and said generating and preparing step further comprises reinitializing said control process and proceeding with generation of new control information while said first control cell awaits transmission in said storage location, and preparing a new control cell and storing said new control cell in said storage location when said first control cell has replaced said detected empty cell to form said second sequence of cells.

5. A method according to claim 4, further comprising the steps of using said control information in a corresponding control process at said receiving end and reinitializing said corresponding control process at said receiving end each time a control cell is detected at said receiving end.

6. A method according to claim 5 wherein said control processes at said transmitting and receiving ends are each performed over a control time period having a minimum duration during which no reinitialization can take place.

* * * * *